O. E. NILSEN.
ELECTRIC BRAKE SYSTEM.
APPLICATION FILED SEPT. 3, 1914.
1,187,372.
Patented June 13, 1916.
3 SHEETS—SHEET 3.
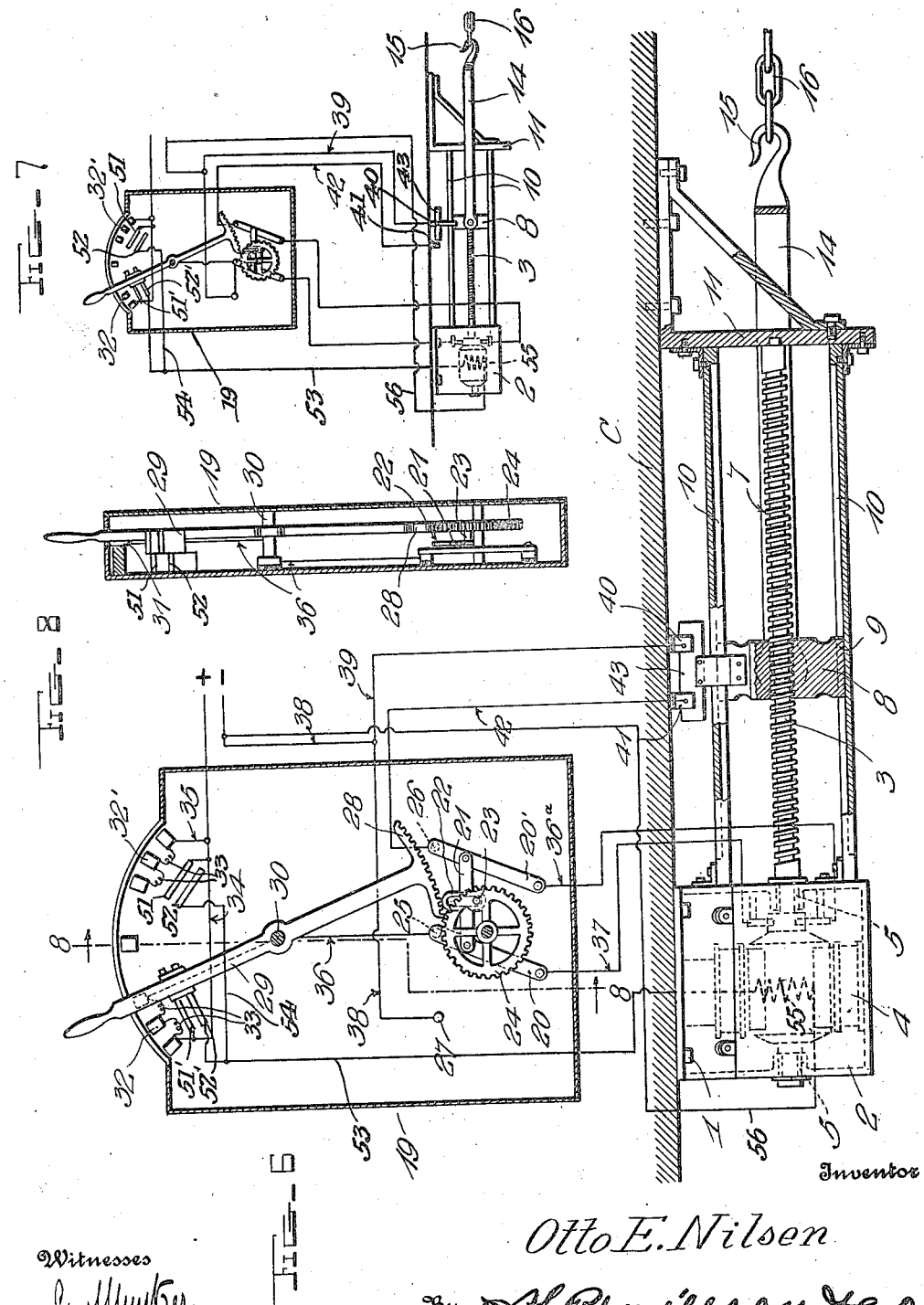

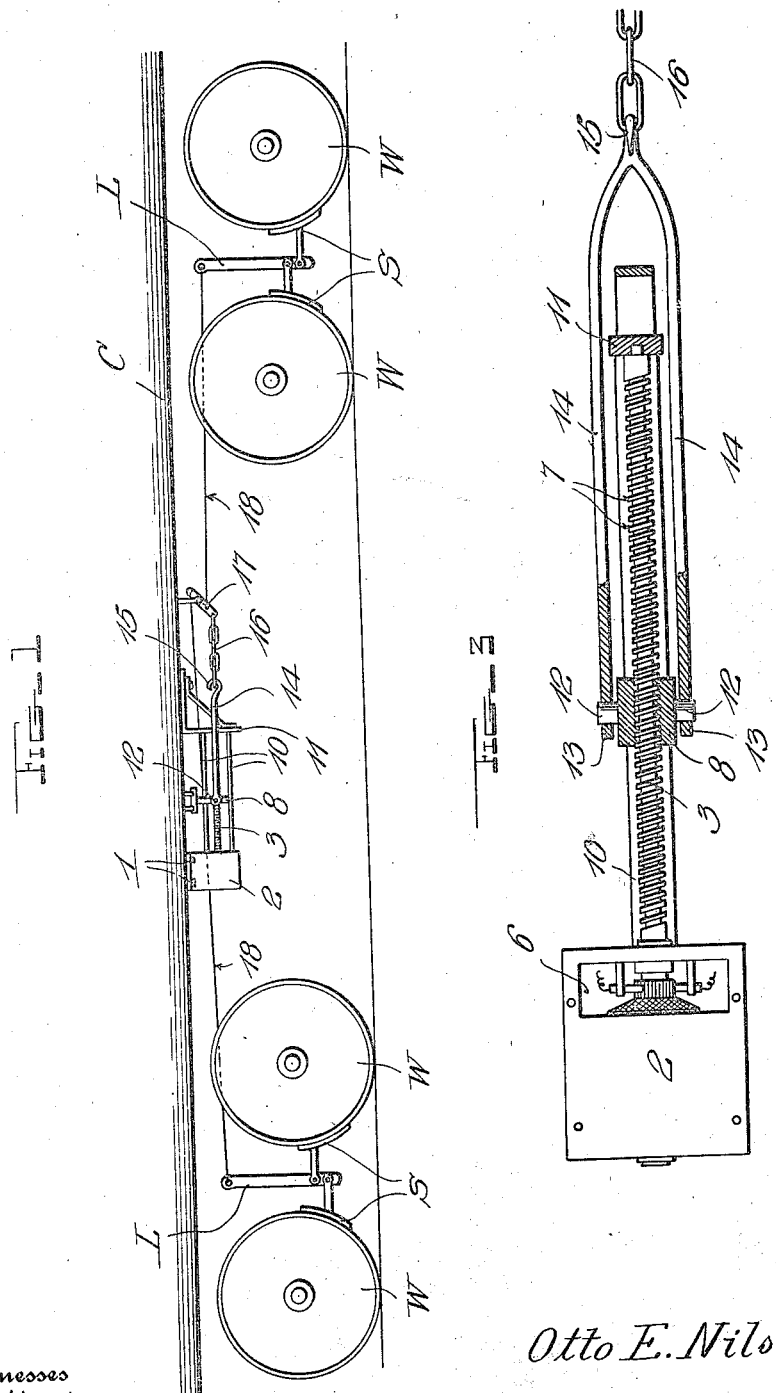

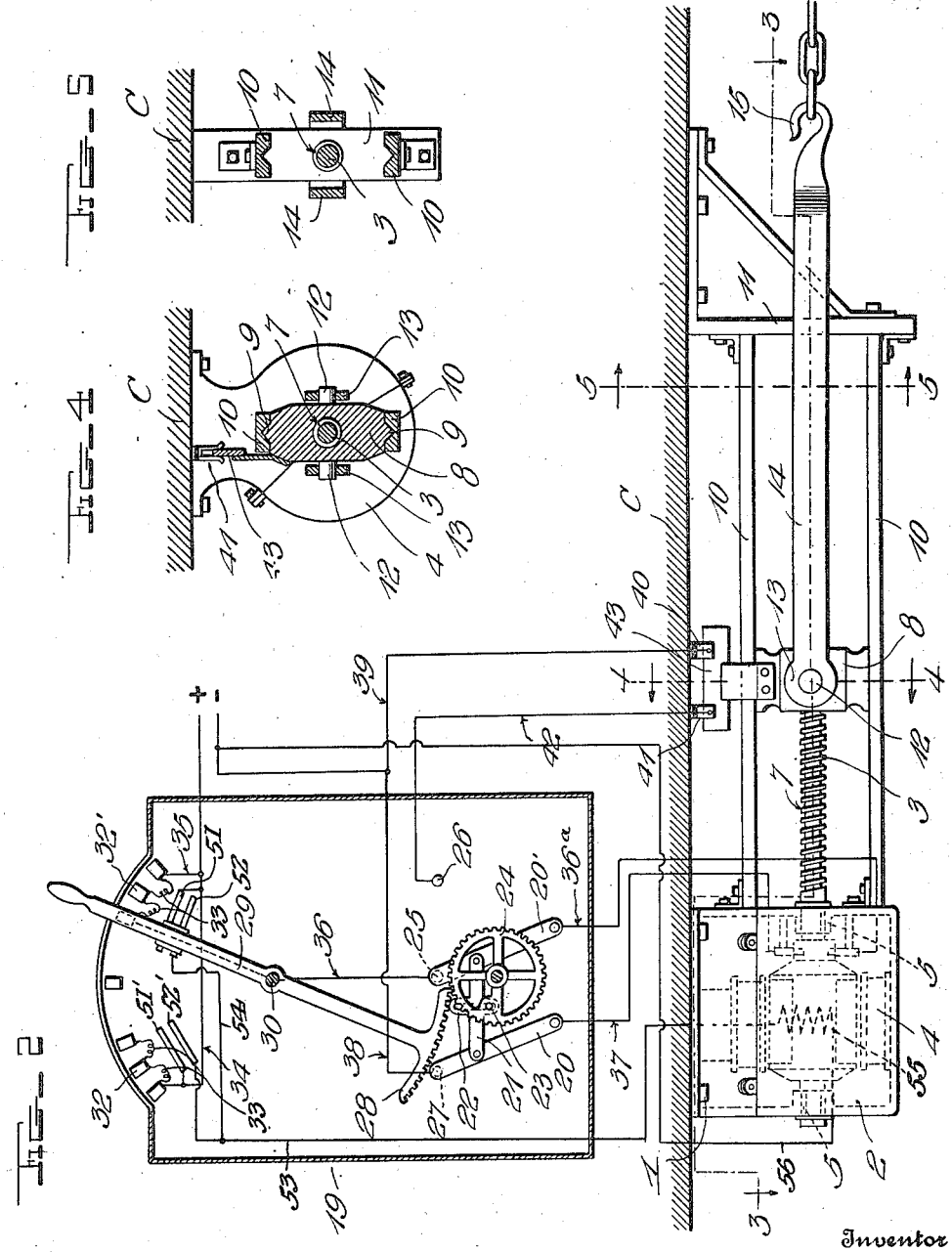

UNITED STATES PATENT OFFICE.

OTTO ERLING NILSEN, OF FARGO, NORTH DAKOTA.

ELECTRIC BRAKE SYSTEM.

1,187,372.  Specification of Letters Patent.  Patented June 13, 1916.

Application filed September 3, 1914. Serial No. 860,058.

*To all whom it may concern:*

Be it known that I, OTTO ERLING NILSEN, a citizen of the United States, residing at Fargo, in the county of Cass and State of North Dakota, have invented certain new and useful Improvements in Electric Brake Systems; and I do declare the following to be a full, clear, and exact description of the invention, such as will enable others skilled in the art to which it appertains to make and use the same.

My invention relates broadly to improvements in brake systems for railway coaches and more particularly to such systems operated by electricity.

The main object of the invention is to provide, in connection with a system of brakes and electric operating mechanism therefor, means operable by the brakes whereby the operating mechanism may be thrown out of action when the brakes are released.

In carrying out the above end, the invention aims to provide a simple and efficient circuit breaker for accomplishing the above mentioned result and a combined pole changer and rheostat whereby an electric motor may be reversed and whereby the speed of said motor, in either direction, may be controlled.

A still further object is to construct the entire system in the most simple manner consistent with its proper operation.

With the above objects in view, the invention resides in certain novel features of construction and combination herein described and shown in the drawings wherein—

Figure 1 is a diagrammatic side elevation of a railway car equipped with my improved brake system; Fig. 2 is an enlarged side elevation of portions of the system and illustrating a vertical section of the combined rheostat and pole changer, the parts being shown in the position they assume when the brakes are applied; Fig. 3 is a horizontal section taken substantially on line 3—3 of Fig. 2; Figs. 4 and 5 are vertical transverse sections taken on the lines 4—4 and 5—5 of Fig. 2; Fig. 6 is a vertical section of the combined rheostat and pole changer illustrating the circuit breaker and the operating motor in diagram, the parts being shown in the position which they assume when retracting the brakes; Fig. 7 is a diagram illustrating the position of parts when the circuit of the motor is automatically broken by the release of the brakes; and, Fig. 8 is a vertical section on the line 8—8 of Fig. 6.

In the accompanying drawings, I have shown, in diagram, any electric trolley car C having the usual trucks comprising pairs of wheels W, brake shoes S and levers L for applying said brake shoes to the peripheries of said wheels. The parts so far described constitutes no part of the present invention, although the same closely coacts therewith.

Secured beneath the car C in any suitable manner as by bolts or lag screws 1, is an electric motor 2 having its spindle 3 elongated and projecting longitudinally of the car. The motor 2 is preferably provided with bearings 5 which are rendered removable by the removal of a detachable side plate 4 and is likewise provided, in its upper side, with a door opening 6 designed to be closed by a trap door located in the bottom of the car C, whereby access to the brushes of said motor may be gained when necessary.

As clearly seen in the various figures of the drawings, the projected portion of the elongated spindle 3 is provided with rather coarsely pitched screw threads 7 which are engaged with a threaded bore formed in an upright cross head 8, the upper and lower ends of said cross head being provided with V-shaped ribs 9 which travel in similarly shaped grooves formed in upper and lower longitudinal guides 10. One end of the guides 10 is rigidly secured to the casing of the motor 2 by any suitable means while the opposite ends of said guides are secured to a bracket 11 whose horizontal arm is secured to the bottom or floor of the car C while its upright arm depends therefrom. It is to this upright arm the guides 10 are directly connected.

Projecting laterally in opposite directions from the cross head 8, is a pair of pivot studs 12 which loosely receive eyes 13 carried by the parallel arms 14 of a yoke which straddles the bracket 11 and is provided with a hook 15 at its free end, said hook being herein shown as connected by a chain or other flexible element 16 with a lever 17 pivoted beneath the car C, connecting rods 18 being provided between the lever 17 and the levers L whereby when said cross head is moved toward the motor 2, by the action of the screw threads 7, the brake shoes S will be applied.

For the purpose of rotating the armature of the motor in either direction, I provide means now to be described. Located at a suitable point on the car C, preferably at a point easily accessible to the motorman thereof is a combined rheostat and pole changer 19, this device including a suitable casing which carries a pair of pivoted switch blades 20 and 20' which are connected by a transverse link 21 having an upright yoke 22 at its central portion, said yoke receiving therein, a crank pin 23 which projects laterally from a gear 24 which is revolubly mounted within the casing. By this construction when said gear is turned in one direction, the blade 20 will contact with an intermediate switch point 25 while the other blade 20' will contact with an outer switch point 26 and whereby, when said gear is rotated in the opposite direction, the blade 20 will contact with a second outer switch point 27 while the blade 20' will engage the intermediate point 25, thereby reversing the direction of the current traveling through these parts in a manner to be more clearly set forth.

For the purpose of actuating the gear 24, I provide a segmental rack 28 which is carried by the lower end of a lever 29 which is pivoted intermediate its ends as indicated at 30, said lever having a switch point 31 near its upper end designed to coact with trios of switch points 32 and 32' carried by the casing, the points of each trio being connected by resistance coils 33, while a current conducting wire 34 is connected to the outermost of the points in the series 32 and, through the instrumentality of a branch wire 34, is connected to the outermost of the series 32'. Leading from the point 31 on the lever 29 to the intermediate contact point 25, is a current conducting wire 36 from which the arm 20' is designed to conduct current when the parts stand as seen in Fig. 2, the current then flowing through a wire 36ᵃ to one terminal of the motor 2 while still another wire 37 leads from said motor to the pivot of the arm or blade 20 through which the current is then conducted to the point 27 to which a current conducting wire 38 is attached, said wire returning to the battery or other source of current supply employed. The above described travel of the current will rotate the armature of the motor 2 to draw the cross head 8 inwardly thereby applying the brakes. During this operation, the speed of the motor may be controlled by proper actuation of the lever 29 whose segmental rack 28 now disengages the gear 24.

Leading from the wire 38 is a branch wire 39 which is connected to a switch member 40 carried by the under side of the car C, a second switch member 41 being spaced from the member 40 and being connected by a wire 42 with the switch point 26. It will further be seen that when the parts stand as seen in Fig. 6, the current will flow through the series of points 32 and the wire 36 to the intermediate point 25 from which it will pass to the wire 37 through the switch blade 20, the current then continuing through the motor 2 to the pivoted end of the switch blade 20' which now conducts said current to the switch point 26 from which it passes to the switch member 41. It will likewise be seen that the current flowing from the opposite pole of the generating device, will flow through the wires 38 and 39 to the switch member 40.

In order to bridge the gap between the members 40 and 41, a sliding switch member 43 is provided which is attached by any suitable means to the cross head 8, said member 43 completing the electric circuit when the parts stand as seen in the said Fig. 6. It will be understood that this switch member 43 assumes this position when the brakes are applied and that the pole changing device (comprising the arms 20 and 20' and the points coacting therewith) is shifted to the position seen in the figure in question, thereby reversing the direction of the current and causing the armature of the motor 2 to rotate in the reverse direction, this direction of movement likewise reversing the threaded extension 3 and projecting the cross head 8 to release or retract the brakes. During this movement of the cross head, the switch member 43 slides within the members 40 and 41 until the brakes have been retracted to the necessary extent, at which point, said member 43 will be disengaged from the member 41 as clearly seen in Fig. 7 thereby breaking the circuit and bringing the motor to a standstill. During this last mentioned movement of the motor, its speed may be controlled by proper actuation of the lever 29 in connection with the resistance points 32 as will be clearly understood by an inspection of the drawings.

From the foregoing description taken in connection with the accompanying drawings, it will be seen that I have provided, in general, the combination with a system of brakes, of an electric motor for applying and releasing the same, electric wiring whereby to produce a pair of electric circuits including said motor, a pole changer whereby the current may be shifted into one circuit for rotating the motor in a direction to apply the brakes, or into the other circuit to reverse the motor thereby retracting said brakes, and a circuit breaker in the last mentioned circuit and operable by the retraction of the brakes, whereby said motor may be brought to standstill.

I have described my invention with considerable minuteness and have set forth certain specific embodiments for carrying out the objects of the invention but it will be evident that I need not be limited to details of construction other than those set forth in the appended claim.

Having thus described my invention what I claim as new and desire to secure by Letters-Patent is:—

In combination with a support, brake rods and brakes; of a motor casing mounted on said support, a motor carried therein, a bracket also mounted on said support and spaced from said motor casing, a threaded shaft carried by the motor spindle and rotatable therewith, said shaft being also supported by said bracket, a pair of spaced apart longitudinal guides disposed in the plane of said shaft and secured by their opposite ends to the bracket and the end wall of said casing, said guides having longitudinal V-shaped grooves in their inner sides, a cross head having a centrally disposed threaded bore coacting with said threaded shaft, V-shaped ribs on the ends of said head for coaction with said V-shaped grooves, a pair of spaced apart U-shaped contact plates carried by the support, a longitudinally elongated contact plate yieldably embraced by the arms of the U-shaped plates and slidable therebetween, said plate being carried by the cross head and movable therewith, a pair of pivot studs projecting in opposite directions from said cross head, a yoke having parallel arms provided with eyes on their free ends for engagement with said studs, a connection between the other end of said yoke and the brake rod, and an electric circuit including the motor, the pair of U-shaped plates, and the contact plate, whereby the motor may be operated to move the cross head and its brake connection either to release or retract the brakes, the operation of said motor being interrupted when the elongated plate is disengaged from one of said U-shaped plates.

In testimony whereof I have hereunto set my hand in presence of two subscribing witnesses.

OTTO ERLING NILSEN.

Witnesses:
H. H. WARE,
J. A. SHAW.